(12) United States Patent
Barguet et al.

(10) Patent No.: US 7,594,380 B2
(45) Date of Patent: Sep. 29, 2009

(54) HYBRID CABLES WITH LAYERS WHICH CAN BE USED TO REINFORCE TYRES

(75) Inventors: Henri Barguet, Les-Martres-d'Artiere (FR); Le Tu Anh Vo, Clamart (FR); Thibaud Pottier, Malauzat (FR); Laurence Ducourant, Clermont-Ferrand (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 0 days.

(21) Appl. No.: 11/020,224

(22) Filed: Dec. 27, 2004

(65) Prior Publication Data
US 2005/0183808 A1    Aug. 25, 2005

Related U.S. Application Data

(63) Continuation of application No. PCT/EP03/06572, filed on Jun. 23, 2003.

(30) Foreign Application Priority Data

Jun. 26, 2002  (FR) .................................. 02 07971

(51) Int. Cl.
*D07B 1/06*    (2006.01)
*D07B 1/08*    (2006.01)

(52) U.S. Cl. .............................. 57/220; 57/222; 57/902; 152/451

(58) Field of Classification Search ................. 152/451, 152/527, 556; 57/220–222, 902
See application file for complete search history.

(56) References Cited

U.S. PATENT DOCUMENTS

| | | | |
|---|---|---|---|
| 4,176,705 A | 12/1979 | Russell et al. | |
| 5,436,076 A | * 7/1995 | Nakata et al. | ........... 152/451 X |
| 6,007,912 A | 12/1999 | Doujak | |

FOREIGN PATENT DOCUMENTS

| | | |
|---|---|---|
| EP | 1 033 435 A | 9/2000 |
| NL | 6512096 A * | 3/1967 |
| WO | WO-80/02572 A1 * | 11/1980 |

* cited by examiner

*Primary Examiner*—Adrienne C Johnstone
(74) *Attorney, Agent, or Firm*—Buchanan Ingersoll & Rooney PC

(57) ABSTRACT

A hybrid layered cable for use in tire reinforcement includes a non-metallic internal layer and an unsaturated external layer including 3-12 strands. Each strand is at least partly metallic and is helically wound around the internal layer. Each strand includes at least 3 filaments wound helically together. The cable has a relative elongation at break, measured in tension in accordance with the standard ISO 6892 of 1984, which is higher than 7%.

31 Claims, 2 Drawing Sheets

HYBRID CABLES WITH LAYERS WHICH CAN BE USED TO REINFORCE TYRES

This application is a continuation of International PCT/EP2003/006572 filed on Jun. 23, 2003, and which claims priority from French Application No. 02/07971 filed on Jun. 26, 2002.

BACKGROUND

The present invention concerns hybrid layered cables some of which can be used to reinforce at least one crown protection ply for tyres fitted on heavy vehicles or earthmovers, and others to reinforce the tyre beads in light motorised vehicles such as motorcycles. The invention also concerns a composite fabric usable as a crown protection ply for such heavy vehicles or earthmovers, a bead wire intended to reinforce the said tyre beads, and the aforesaid tyres.

As a general rule steel cables for tyres consist of wires of pearlitic (or ferrite-pearlite) carbon steel, hereinafter "carbon steel", with a carbon content generally between 0.2% and 1.2%, the diameter of the wires being most often between 0.10 and 0.40 mm. These wires are required to have very high tensile strength, generally higher than 2000 MPa and preferably higher than 2500 MPa, obtained thanks to the structural hardening that takes place during the cold-drawing of the wires. The wires are then assembled in the form of cables or strands, which requires the steels used also to possess a torsional ductility sufficient to withstand the various cabling operations.

In a known way tyres for heavy vehicles, earthmovers and light motorised vehicles usually comprise a carcass reinforcement anchored in two beads and surmounted radially by a crown reinforcement comprising one or more working crown plies, this crown reinforcement itself being surmounted by a tread joined to the tyre beads by two sidewalls. For heavy vehicle or earthmover tyres only, the crown reinforcement also comprises one or more crown protection plies surmounting the working crown ply or plies.

The crown protection plies essentially have the function of presenting an obstacle, during rolling, to the penetration of foreign bodies radially into them, foreign bodies which affect earthmover tyres in particular, since they often travel over ground covered with sharp stones.

To reinforce the carcass reinforcement and the working crown ply of radial tyres such as heavy vehicle tyres, one usually uses steel cables said to be "layered" or "multilayered", which consist of a central core and one or more concentric layers of filaments arranged around the core, so that the rigidity of the cable will be almost equal to the sum of the rigidities of the filaments constituting it. Among layered cables a distinction is made in particular, in a known way, between cables with a compact structure and cables with tubular or cylindrical layers.

Such layered cables have been described in a very large number of publications. Reference can be made in particular to the documents GB-A-2 080 845; U.S. Pat. Nos. 3,922,841; 4,158,946; 4,488,587; EP-A-168 858; EP-A-176 139 or U.S. Pat. No. 4,651,513; EP-A-194 011; EP-A-260 556 or U.S. Pat. Nos. 4,756,151; 4,781,016; EP-A-362 570; EP-A-497 612 or U.S. Pat. No. 5,285,836; EP-A-567 334 or U.S. Pat. No. 5,661,965; EP-A-568 271; EP-A-648 891; EP-A-601 402 or U.S. Pat. No. 5,561,974; EP-A-669 421 or U.S. Pat. No. 5,595,057; EP-A-675 223; EP-A-709 236 or U.S. Pat. No. 5,836,145; EP-A-719 889 or U.S. Pat. No. 5,697,204; EP-A-744 490 or U.S. Pat. No. 5,806,296; EP-A-779 390 or U.S. Pat. No. 5,802,829; EP-A-834 613 or U.S. Pat. No. 6,102,095; WO-A-98/41682; RD (Research Disclosure) No. 316107, August 1990, p. 681; RD No. 34054, August 1992, pp. 624-33; RD No. 34370, November 1992, pp. 857-59; RD No. 34779, March 1993, pp. 213-214; RD No. 34984, May 1993, pp. 333-334; RD No. 36329, July 1994, pp. 359-365.

The layered cables most widely used in the carcass reinforcements and working crown plies of radial tyres are essentially cables having the formulae [M+N] or [M+N+P], the latter generally intended for the largest tyres. These cables are formed in a known way from a core of M filament(s) surrounded by at least one layer of N filaments, if necessary itself surrounded by an external layer of P filaments, in which M generally ranges from 1 to 4, N from 3 to 12 and P from 8 to 20, depending on the case, the whole if necessary being hooped by an external hoop filament rolled in helix around the last layer.

American patent U.S. Pat. No. 4,176,705 discloses a hybrid layered cable designed in particular to reinforce the carcass reinforcement of a heavy vehicle or earthmover tyre. The inner layer of this cable consists of a multifilament core made of a non-metallic material with tensile strength equivalent to that of steel, and the external layer of the cable, which is unsaturated, consists for example of 6 metallic strans each comprising 4 wires twisted in a direction opposite to that of the said strands, in a S-Z structure.

The non-metallic material constituting the said multifilament core, preferably aramid, is chosen specifically to provide the cable with a rigidity close to the sum of the rigidities of its constituents and not to reduce the overall tensile strength of the cable, in contrast to materials such as aliphatic polyesters whose tensile strength is far lower than that of steel. This aramid core is also provided to fill the gaps between the stranded wires, so as to minimise the corrosion of the cable due to water infiltration, and the diameter of the core is accordingly chosen equal to or larger than that of each metallic strand.

For the reinforcement of the crown protection plies of heavy vehicle or earthmover tyres, the cables generally used nowadays are not layered cables but cables with strands ("strand cables") which are assembled by the known technique of stranding and which consist, by definition, of a plurality of metallic strands twisted together in helix, each strand comprising a plurality of steel wires also twisted together in helix.

Note that most of the filaments used in these cables for crown protection plies have a diameter typically larger than 0.20 mm, for example close to 0.25 mm, a diameter larger in particular than that of the filaments used in the cables for carcass reinforcements in the said tyres. These cables for crown protection plies are intended on the one hand to confer optimum suppleness on the ply containing them so that the said crown protection ply can the better conform to the shape of the obstacle it encounters during rolling, and on the other hand to allow the ply to resist the penetration of foreign bodies radially into it.

Note also that the said strand cables must be impregnated as completely as possible by the rubber, so that the latter penetrates into all the spaces between the wires constituting the cables. In effect, if penetration is insufficient, empty channels are formed along the cables and corrosive agents, for example water, which can penetrate into tyres for example after cuts or other damage to the crown reinforcement of the tyre, travel along these channels through the said reinforcement. The presence of this humidity plays an important part in causing corrosion and accelerating fatigue (so-termed "fatigue-corrosion" phenomena), compared with use in a dry atmosphere.

For the specific reinforcement of the crown protection plies of tyres for earthmovers, the applicant at present uses strand cables of formula 4×6 (i.e. consisting of 4 strands, each with 6 steel wires) in the earthmover tyres of size "40.00 R57 XDR" that it markets, each wire in a strand having a diameter for example of 0.26 mm. Experience has shown that these cables are entirely satisfactory for this reinforcing function, since in particular they delay the appearance and spread of perforations or cuts between the tread and the crown protection plies.

SUMMARY OF INVENTION

The purpose of the present invention is to propose a new cable, in particular used for reinforcing at least one crown protection ply of a heavy vehicle or earthmover tyre, and was arrived at when the applicant discovered that, surprisingly, the use in a layered hybrid cable of at least one non-metallic material having a relative elongation at break Ar at 20° C. greater than 6% to constitute the internal layer forming the core of the cable, which comprises an unsaturated external layer comprising strands which are at least in part metallic and are twisted in helix around the internal layer, confers on the said cable a relative elongation at break At, measured in traction in accordance with ISO 6892 of 1984, which is higher than 7%.

The layered cables according to the invention can be used advantageously to replace cables of the types mentioned earlier, assembled by stranding and currently used to this day to reinforce these crown protection plies, since they show a relative elongation at break At (i.e. a total elongation At which is the sum of the structural As, elastic Ae and plastic Ap elongations) much higher than those of the known cables.

Indicatively, the aforementioned strand cable of formula 4×6 has a relative elongation at break At, measured in traction in accordance with ISO 6892 of 1984, equal to 5.4% (this being the sum of the said relative elongations As, Ae and Ap which are equal to 1.9%, 2.3% and 1.2% respectively).

This high value of the relative elongation at break At of the cables according to the invention and the increased suppleness of the said cables resulting therefrom enables the tension of crown protection plies reinforced with these cables to be reduced during severe stressing, which has in particular the effect of reducing the sensitivity of the plies to the spread of cuts and especially to corrosion damage.

Note that this high value of At is obtained by using in the said internal layer a material whose rigidity is much lower than that of the steel used for the strands, such as a textile material consisting of an aliphatic polyamide, an aliphatic polyester or rayon (in contrast to aramid for example, which cannot be used in the present invention because its relative elongation at break Ar at 20° C. is about 3%, close to that of cold-drawn steel which is about 1.8%).

Preferably, the internal layer is made at least of a textile material having an elongation at break Ar at 20° C. which is higher than 10%.

Note also that the internal layer of the cables according to the invention essentially confers on the crown protection ply reinforced with these cables, on the one hand an elastic character during the fabrication of the tyre, and on the other hand reduced rigidity when it is stressed during rolling.

The external layer of cables according to the invention is a tubular layer of N strands which is referred to as "unsaturated" or "incomplete", meaning that by definition there is enough room in the said tubular layer to add at least a (N+1)th strand of the same diameter as the others, with several of the N strands being possibly in contact with one another. Reciprocally, the tubular layer would be classed as "saturated" or "complete" if there were not enough room in the layer to add to it at least a (N+1)th strand of the same diameter.

Note in addition that this unsaturated external layer favours the penetration of the rubber around the said internal layer (i.e. between the strands), which contributes towards reducing corrosion damage still further.

Advantageously, hybrid layered cables according to the invention can have a relative elongation at break At, again measured in traction in accordance with the standard ISO 6892 of 1984, which is equal to or higher than 10% and, more advantageously still, equal to or higher than 12%.

The said internal layer forming the core of a cable according to the invention can consist of a single filament or several filaments twisted together to form a cable (or "plied yarn"), it being understood that in the present description the term "filament" can denote just as well:

- a multifilamentary fibre consisting of elementary filaments of small diameter parallel to one another,
- a yarn based on a multitude of such elementary filaments twisted together (this yarn, often called "folded yarn" by those familiar with the field, can for example be based on about a hundred elementary filaments each with diameter of about ten microns), or
- a single monofilament.

In this context "monofilament" means, in a known way, a single filament whose diameter or thickness D (i.e. the smallest transverse dimension of its perpendicular cross-section when it is not circular) is larger than 100 μm. Thus, this definition covers both monofilaments of substantially cylindrical shape (i.e. with circular cross-section) and oblong monofilaments, ones of flattened shape, or even strips or films of thickness D.

In this description the linear mass of each non-metallic element, such as the said internal layer or core, is determined on at least three samples, each 50 m long, by weighing that length of the non-metallic element. The linear mass is given in tex (weight in g of 1000 m of the non-metallic element—remembering that 0.111 tex is equal to 1 denier), after previous conditioning which consists in storing each non-metallic element (after drying) for at least 24 hours, in a standard atmosphere in accordance with European standard DIN EN 20139 (temperature of 20±2° C.; humidity 65±2%).

The mechanical properties under traction (tenacity, initial modulus, relative elongation at break Ar) of each nonmetallic element are determined in a known way using a "ZWICK GmbH & Co." (Germany) tensile testing machine of type 1435 or 1445. Each non-metallic element is subjected to traction on an initial length of 400 mm at a nominal speed of 50 mm/min. All the results given in the remainder of this description are means of 10 measurements carried out after the aforesaid conditioning.

The tenacity (rupture force divided by linear mass) and the initial modulus are indicated in cN/tex (remembering: 1 cN/tex=0.11 g/den). The initial modulus is defined as the slope of the linear portion of the force-elongation curve, occurring just after a standard pre-tension of 0.5 cN/tex. The relative elongation at break is indicated as a percentage.

The diameter D of the monofilaments is determined by calculation from the linear mass of the monofilaments and from their density, using the formula:

$$D = 2.10^{1.55} [Ti/\pi \rho]^{0.5}$$

with D in μ, Ti being the linear mass (tex) and ρ the density in g/cm$^3$.

In the case of a monofilament with a non-circular cross-section, i.e. other than a monofilament of substantially cylindrical shape, the parameter D, which then represents the smallest dimension of the monofilament in a plane normal to its axis, is no longer determined by calculation but experimentally, by optical microscopy of a cross-section of the monofilament, the latter having for example previously been embedded in a resin to facilitate cutting.

According to an example embodiment of the invention, the said internal layer forming the core of a cable according to the invention is composed of an aliphatic polyamide, preferably a 6.6 polyamide.

According to another example embodiment of the invention, the said internal layer is composed of an aliphatic polyester, preferably a polyethylene terephthalate (PET) or a polyethylene naphthalate (PEN).

According to another example embodiment of the invention, the said internal layer is composed of rayon. According to another example embodiment of the invention, the internal layer is composed of polyvinyl alcohol (PVA).

According to an embodiment of the invention, the said internal layer forming the core is composed of a monofilament.

According to another preferred embodiment of the invention, the internal layer is multifilamentary, and can optionally consist of one or more yarn(s), each based on a multitude of elementary filaments, or one or more folded yarns each obtained by bringing together several yarns, or one or more twisted cables each consisting of several folded yarns twisted together, or of a textile cable.

Note that this multifilamentary core has the advantage of remaining axially shorter than the external layer of the cable according to the invention, which facilitates the operations of welding together two cable ends and of building up plies of "straight filament" cables. Furthermore, the cost of this multifilamentary core is lower.

According to another characteristic of the invention, each strand of said external layer, whose number ranges from 3 to 12, comprises at least 3 filaments which may or may not all be metallic wires and which are wound in helix of pitch equal to or less than the winding pitch of the said strands on the said internal layer.

The said metallic wires present in the strands consist for example of steel with a carbon content ranging from 0.2 to 1.2% and preferably between 0.5 and 1.0%.

Preferably, a cable according to the invention, which comprises the said internal layer of diameter $d_i$, $d_i'$ on which the said strands, numbering N or N', are wound in helix of pitch $p_i$, $p_i'$, is such that each strand comprises optionally:
(a) either n metallic wires of diameter $d_e$ which are wound together in helix of pitch $p_e$, or which comprise n-1 wires wound around a core wire for the strand with pitch $p_e'$, the said cable then satisfying all the following conditions:
  (ai) the said internal layer is composed of a material having a relative elongation at break Ar at 20° C. in excess of 6%;
  (aii) $0.17 \leq d_e$ (in mm) $\leq 0.36$;
  (aiii) $1.1 d_e \leq d_i$ (in mm) $\leq 5. d_e$;
  (aiv) $3 \leq N \leq 12$;
  (av) $3 \leq n \leq 6$;
  (avi) $5. d_i \leq p_e$ (in mm) $\leq 20. d_i$ or $5. d_i \leq p_e'$ (in mm) $\leq 20. d_i$;
  (avii) $p_e \leq p_i$ (in mm) $\leq 3. p_e$ or $p_e' \leq p_i$ (in mm) $\leq 3. p_e'$;
(b) or m metallic wires of diameter $d_e'$ wound in helix of pitch $p_e''$ around a non-metallic core filament of diameter $d_{fa}$, the said cable then satisfying all the following conditions:
  (bi) the said internal layer is composed of identical or different materials each having a relative elongation at break Ar at 20° C. in excess of 6%;
  (bii) $0.17 \leq d_e'$ (in mm) $\leq 0.36$;
  (biii) $1.1. d_e' \leq d_{fa}$ (in mm) $\leq 3. d_e'$;
  (biv) $1.1. (d_{fa}+2. d_e') \leq d_i' \leq 3. (d_{fa}+2. d_e')$;
  (bv) $3 < N' \leq 12$;
  (bvi) $5 \leq m \leq 12$;
  (bvii) $10. d_i' \leq p_e''$ (in mm) $\leq 20. d_i'$;
  (bviii) $p_e'' \leq p_i'$ (in mm) $\leq 3. p_e''$.

Preferably, a cable according to the invention is such that the said filaments of each strand, on the one hand, and the said strands, on the other hand, are wound in the same twist direction (direction S/S or Z/Z).

In the above case (a), in which each strand is entirely metallic, a cable according to the invention preferably satisfies the relation:
  (aviii) $1.5. p_e \leq p_i$ (in mm) $\leq 2. p_e$ or $1.5. p_e' \leq p_i$ (in mm) $\leq 2. p_e'$.

Also in this case (a), a cable according to the invention still more preferably satisfies the relation:
  (aix) $4 \leq p_e \leq p_i$ (in mm) $\leq 12$ or $4 \leq p_e' \leq p_i$ (in mm) $\leq 12$.

According to a first example embodiment of the said case (a), a cable according to the invention comprises N=4 metallic strands each consisting of n=6 metallic wires, namely a metallic core wire around which 5 other metallic wires are wound in helix. Thus, the cable has the formula 1+4×(1+5). In a non-limiting way, the internal layer of the cable can advantageously consist of an aliphatic polyamide, aliphatic polyester, PVA, or rayon monofilament, this monofilament having a diameter between 0.6 mm and 0.8 mm.

According to a second example embodiment of this case (a), a cable according to the invention comprises N=5 metallic strands each consisting of n=6 metallic wires, namely a metallic core wire around which 5 other metallic wires are wound in helix. Thus, the cable has the formula 1+5×(1+5). In a non-limiting way, the internal layer of this cable can consist of an aliphatic polyamide, aliphatic polyester, PVA, or rayon monofilament, this monofilament having a diameter between 0.7 and 0.9 mm.

In the above case (b), in which each strand is only partially metallic, a cable according to the invention preferably satisfies the relation:
  (bix) $1.5. p_e'' \leq p_i'$ (in mm) $\leq 2. p_e''$.

Also in this case (b), a cable according to the invention still more preferably satisfies the relation:
  (bx) $4 \leq p_e'' \leq p_i'$ (in mm) $\leq 12$.

In an embodiment of the said case (b), a cable according to the invention comprises N=3 strands each consisting of 7 filaments, namely a non-metallic core filament around which m=6 metallic wires are wound in helix. Thus, the cable has the formula 1+3×(1+6). As an example, the internal layer of the cable and the said core filament can advantageously consist of an aliphatic polyamide, aliphatic polyester, PVA, or rayon monofilament.

The hybrid layered cables according to the invention are assembled by a plying process which consists essentially in:
  winding the strands of the said external layer in helix around the said internal layer, with a given provisional plying pitch,
  producing an overtwist intended to reduce this provisional pitch, i.e. to increase the spiral angle of the said external layer and consequently its spiral curvature, and
  stabilising the cable obtained by untwisting to obtain zero residual torque.

Note that for use in crown protection plies the total diameter of the hybrid layered cables according to the invention is preferably larger than 2 mm, and more preferably still, the said diameter can range from 2.2 mm to 4 mm.

The above-mentioned plying process carried out to obtain a cable according to the invention confers on the external strand layer of the cable an excessive curvature which detaches it from the internal layer. This curvature is determined on the one hand by the spiral diameter of the said external layer, and on the other hand by the spiral pitch or by the spiral angle of the said external layer (angle measured relative to the axis of the cable).

Note that the internal layer of cables according to the invention allows both the spiral diameter and the spiral angle to be increased.

According to the invention, this spiral angle is relatively large, ranging from 25° to 45°.

The elastic nature of the said internal layer enables part of the initial tension applied to it to be preserved in the cable finally obtained by the aforesaid process, so as to place the said external layer under compression, which contributes towards a significant increase of the structural elongation As of the cable (which is proportional to $tg^2$ (spiral angle)). Note also that the elongation As is increased still more by the fact that the said external layer consists of strands.

A composite fabric according to the invention can be used as the crown protection ply of a tyre for heavy vehicles or earthmovers, and comprises a rubber composition based on at least one diene elastomer which is reinforced by reinforcing elements consisting of the said cables according to the invention.

This rubber composition is based on (i.e. formed by) at least one diene elastomer and, besides this diene elastomer, it comprises all the usual ingredients such as reinforcing filler, cross-linking system and other additives, usable in rubber compositions for tyres.

As is known, "diene" elastomer is understood to mean an elastomer obtained at least in part (i.e. a homopolymer or copolymer) from diene monomers, i.e. ones having two carbon-to-carbon double bonds, whether conjugated or not.

In general, an "essentially unsaturated" diene elastomer is here understood to mean one obtained at least in part from conjugated diene monomers, having a content of elements or units of diene origin (conjugated dienes) in excess of 15% (mole %). Thus, for example, diene elastomers such as the butyl rubbers or the copolymers of dienes and alpha-olefins of the EPDM type are not covered by the above definition and can in particular be classified as "essentially saturated" diene elastomers (having low or very low contents of units of diene origin, always lower than 15%).

In the category of "essentially unsaturated" diene elastomers, a "highly unsaturated" diene elastomer in particular is understood to mean a diene elastomer with a content of units of diene origin (conjugated dienes) higher than 50%.

Given the above definitions, the diene elastomer of the composite according to the invention is preferably chosen from the group consisting of the polybutadienes, natural rubber, the synthetic polyisoprenes, the various copolymers of butadiene, the various copolymers of isoprene, and mixtures of these elastomers.

Among the polybutadienes, particularly suitable are those with a content of −1, 2 units between 4% and 80% or those with a cis-1,4 content greater than 80%. Among the synthetic polyisoprenes, the cis-1,4 polyisoprenes are particularly suitable, preferably those with cis-1,4 bond contents above 90%. Among the copolymers of butadiene or isoprene, those preferred are in particular copolymers obtained by copolymerisation of at least one of these two monomers with one or more vinyl-aromatic compounds having 8 to 20 carbon atoms. Suitable vinyl-aromatic compounds are for example styrene, ortho-, meta- or para-methylstyrene, the commercial mixture "vinyl-toluene", para-tertiobutylstyrene, the methoxystyrenes, the chlorostyrenes, vinylmesitylase, divinylbenzene, or vinylnaphthalene. The copolymers may contain between 99% and 20% by weight of diene units and between 1% and 80% by weight of vinyl-aromatic units. Among the above copolymers of butadiene or isoprene, the copolymers of butadiene-styrene, the copolymers of isoprene-butadiene, the copolymers of isoprene-styrene, or the copolymers of isoprene-butadiene-styrene can be mentioned as preferable.

In summary, the preferred diene elastomer is one chosen from the group of highly unsaturated diene elastomers consisting of the polybutadienes (BR), natural rubber (NR), the synthetic polyisoprenes (IR), the copolymers of butadiene-styrene (SBR), the copolymers of isoprene-butadiene (BIR), the copolymers of isoprene-styrene (SIR), the copolymers of butadiene-styrene-isoprene (SBIR) and mixtures of these elastomers.

Still more preferably, the major part (i.e. over 50% by weight) of the elastomer matrix of the rubber composition according to the invention should be a diene elastomer consisting of natural rubber or a synthetic polyisoprene, best of all consisting of natural rubber.

However, according to another advantageous embodiment of the invention, blends of these polyisoprenes with other highly unsaturated diene elastomers, in particular with the above-mentioned SBR or BR elastomers, can also be used.

Of course, the rubber matrixes of the composite fabrics of the invention can contain one or more diene elastomers, which can be used in association with any type of non-diene synthetic elastomer or indeed with polymers other than elastomers, for example thermoplastic polymers.

The rubber compositions of the composite fabrics according to the invention also contain all or part of the additives customarily used in the manufacture of tyres, such as reinforcing fillers like carbon black and/or an inorganic reinforcing filler such as silica, anti-ageing agents such as anti-oxidants, extension oils, plasticisers or agents which facilitate the use of the compositions in the uncured state, a cross-linking system based either on sulphur or on sulphur donors and/or peroxide, accelerators, vulcanisation activators or retarders, methylene acceptors and donors, resins, known adhesion promoter systems of the "RFS" type (resorcinol-formaldehyde-silicon), or metallic salts, in particular cobalt salts.

The composite fabric according to the invention can take various forms, for example the form of a ply, a strip, a narrow strip or a block of rubber in which the metallic reinforcement is incorporated by various means known to those versed in the art, such as moulding, calendering or pressing.

According to another characteristic of the composite fabric according to the invention, in the cross-linked state the said rubber composition has a secant modulus M10, as measured in accordance with the standard ASTM D 412, of between 5 and 12 MPa and preferably between 6 and 11 MPa.

The cables according to the invention are arranged parallel to one another in the composite fabric, on the one hand with a density (denoted "d") of cables per dm of fabric, and on the other hand with a rubber "bridge" width between two adjacent cables (this width, denoted "ΔL" hereinafter, expressed in mm, represents as is known the difference between the calendering or laying interval of the cable in the fabric and the diameter of the said cable), d and ΔL being specifically determined having regard to the specific reinforcement desired in the present invention, i.e. for the reinforcement of a crown protection ply of a tyre for heavy vehicles or earthmovers.

In the case of a composite fabric according to the invention which constitutes a crown protection ply of a tyre for earthmovers, the axis-to-axis distance between two adjacent cables is for example between 3 and 4 mm. Below the minimum value indicated, the rubber bridge, being too narrow, risks becoming mechanically degraded during the working of the ply, in particular as a result of deformations undergone in its own plane by extension or shear. Above the maximum indicated, there is an increased risk of perforation between the cables.

Note that the composite fabric according to the invention is such that its density d of cables is preferably between 20 and 40 cables per dm of fabric.

According to another characteristic of the composite fabric of the invention, the width ΔL of the rubber bridge between two adjacent cables is between 0.5 and 1.3 mm and preferably between 0.6 and 0.9 mm A bead wire according to the invention is intended to reinforce a tyre bead for a light motorised vehicle such as a motorcycle, and comprises a hybrid layered cable according to the third example embodiment of the invention in case (a) described earlier, this cable comprising N=7 metallic strands each consisting of n=3 metallic wires twisted together in helix.

A tyre casing of a heavy vehicle or earthmover tyre according to the invention, comprising in a known way a carcass reinforcement anchored in two beads and radially surmounted by a crown reinforcement which comprises on the one hand one or more working crown plies, and on the other hand one or more crown protection plies surmounting the said working crown ply or plies, the said crown reinforcement itself being surmounted by a tread connected to the said beads by two sidewalls, is such that at least one of the said crown protection plies comprises the said composite fabric according to the invention.

According to another aspect of the invention, a tyre for a light motorised vehicle such as a motorcycle, which comprises a carcass reinforcement anchored in two beads, is such that, each of the said beads is reinforced by the said bead wire according to the invention.

The characteristics of the present invention described above, as well as others, will be better understood on reading the following description of several example embodiments of the invention, which are presented illustratively and not in any limiting sense, the said description being given with reference to the attached drawings, in which:

DETAILED DESCRIPTION OF PREFERRED EMBODIMENTS

Figure 1:
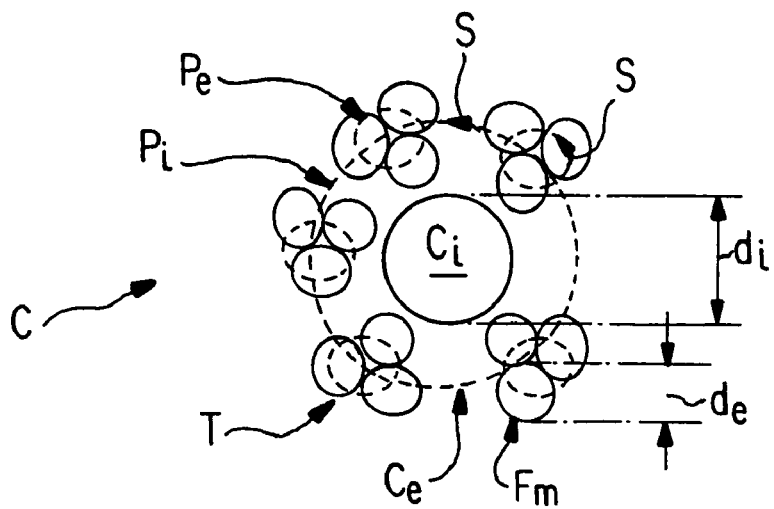
FIG. 1 shows a cross-section of a hybrid layered cable according to a first embodiment of the invention, in which the strands of the external layer are entirely metallic.

Examples of cables according to the invention compared with a "control" cable:

FIG. 1 illustrates a first embodiment of a hybrid layered cable C according to the invention, referring to case (a) mentioned earlier in which the said external layer is entirely metallic.

This cable C comprises a non-metallic internal layer $C_i$ forming its core and an unsaturated external layer $C_e$ comprising N strands T (only 5 strands have been shown, for the sake of clarity), each entirely metallic and wound in helix of pitch $p_i$ around the internal layer $C_i$ of diameter $d_i$.

FIG. 1 shows that each strand T comprises n metallic wires $f_m$ of diameter $d_e$ twisted together in helix of pitch $p_e$. According to the invention, the internal layer $C_i$ is composed of the said material having a relative elongation at break at 20° C. in excess of 6%.

Thus, the cable C of FIG. 1 complies with the third example embodiment of the above case (a) having the formula 1×7×3. In this third example, the cable C comprises on the one hand an internal layer $C_i$ consisting of a "regular"-type polyethylene terephthalate monofilament of diameter $d_i$ equal to 0.8 mm, and on the other hand N=7 strands each consisting of n=3 steel wires of diameter equal to 0.23 mm. Moreover, the pitches $p_e$ and $p_i$ of this cable C are respectively equal to 5.5 and 10 mm in the winding directions S/S (see arrows S in FIG. 1).

Figure 3:
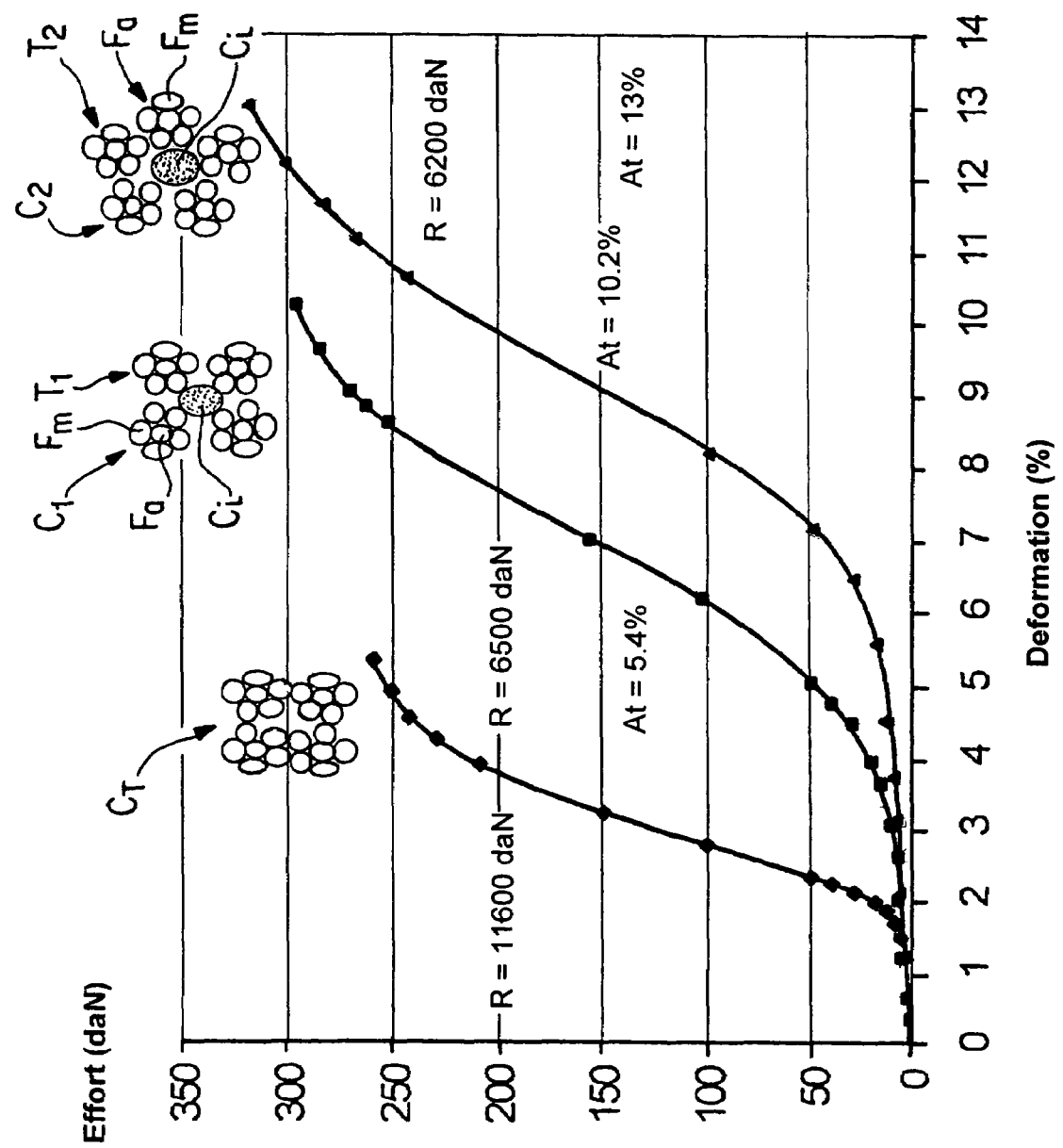
FIG. 3 is a force (daN)—deformation (%) diagram illustrating in particular the tensile strength at break and the relative elongation at break of a "control" strand cable and two hybrid layered cables according to the invention, for the said cables in isolation before their incorporation in the corresponding composite fabric.

A first variant according to the invention of the cable C (denoted $C_1$) is represented in the upper part of the diagram of FIG. 3, opposite the force-deformation curve that characterises the cable $C_1$.

This first variant is such that each strand $T_1$ of the cable $C_1$ comprises n-1 metallic wires $f_m$ wound on a core filament $f_a$ with pitch $p_e'$ The cable $C_1$ complies with the said first example embodiment of the aforesaid case (a), and has the formula 1+4×(1+5). According to this first example, the cable $C_1$ comprises on the one hand an internal layer $C_i$ consisting of a cold-drawn monofilament of polyamide 6.6 (Nylons®, of tenacity 45 cN/tex and diameter $d_i$ equal to 0.7 mm), and on the other hand N=4 strands $T_1$ each consisting of n=6 steel wires, including a core steel wire $f_a$ around which are wound in helix 5 other steel wires $f_m$. The 6 wires $f_m$, $f_a$ of each strand $T_1$ have a diameter equal to 0.26 mm, and the aforesaid pitches $p_e'$ and $p_i$ are respectively equal to 5.5 and 10 mm in the winding directions S/S.

A second variant according to the invention of the cable C of FIG. 1 (denoted $C_2$) is also represented in the upper part of the diagram of FIG. 3, opposite the force-deformation curve that characterises the said cable $C_2$.

This second variant is also such that each strand $T_2$ of the cable $C_2$ comprises n-1 metallic wires $f_m$ wound with a pitch $p_e$ round a core wire $f_m$. The cable $C_2$ complies with the second example embodiment of the above case (a) and has the formula 1+5×(1+5). According to this second example the cable $C_2$ comprises on the one hand an internal layer $C_i$ consisting of a sized 6.6 polyamide monofilament (Nylon®), of tenacity 45 cN/tex and diameter $d_i$ equal to 1 mm), and on the other hand N=5 strands $T_2$ each consisting of n=6 steel wires, including a core steel wire $f_a$ around which are wound in helix 5 other steel wires $f_m$. The 6 wires $f_m$, $f_a$ of each strand $T_2$ have a diameter equal to 0.26 mm and the aforesaid pitches $p_e$ and $p_i$ are respectively equal to 5.5 and 10 mm in the winding directions S/S.

Figure 2:
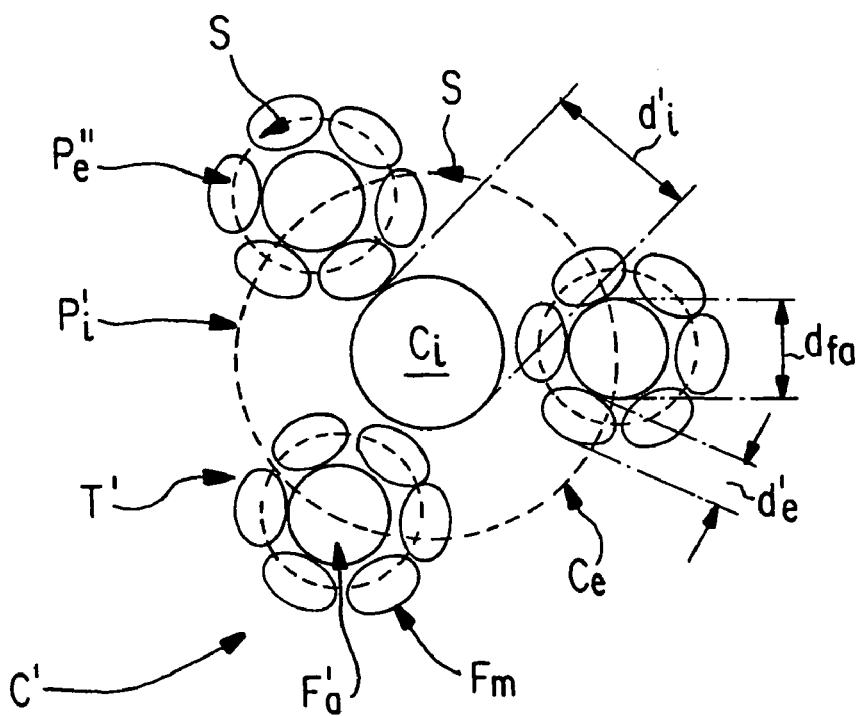
FIG. 2 shows a cross-section of a hybrid layered cable according to a second embodiment of the invention, in which the strands of the external layer are only partly metallic.

FIG. 2 illustrates a second embodiment of a hybrid layered cable C' according to the invention, referring to the above-mentioned case (b) in which the said external layer is only partly metallic.

The cable C' also comprises a non-metallic internal layer $C_i$ forming a core and an unsaturated external layer comprising N' strands T' wound in helix of pitch $p_i'$ around the internal layer $C_i$ of diameter $d_i'$.

FIG. 2 shows that each strand T' comprises m metallic wires $f_m$ of diameter $d_e'$ wound in helix of pitch $p_e''$ around a non-metallic core filament $f_a'$ of diameter $d_{fa}$. According to the invention, the internal layer $C_i$ and the core filament $f_a'$ consist of the same or different materials each having a relative elongation at break at 20° C. in excess of 6%.

More precisely, in the example embodiment of FIG. 2 the cable C' according to the invention has the formula 1+3×(1+6), having N=3 strands each consisting of 7 filaments, including the core filament $f_a'$ around which are wound in helix m=6 steel wires $f_m$. The internal layer $C_i$, of diameter $d_i'$ equal to 1 mm, and the core filament $f_a'$, of diameter $d_{fa}$ equal to 0.6 mm, each consist for example of a "regular"-type polyethylene terephthalate monofilament. As for the said pitches $p_e''$ and $p_i'$, these are for example respectively equal to 4.4 and 6.6 mm.

assembling two yarns each of 220 tex. Each of the 5 strands $T_2$ consists of 6 steel wires of diameter 0.26 mm, and the pitches $p_e'$ and $p_i$ are respectively equal to 5 and 9.4 mm in the S/S directions.

In cable $C_{2quater}$ the internal layer $C_i$ is of the multifilament type and consists of two folded yarns of PET twisted together, each with a linear mass of 440 tex and obtained by assembling two yarns each of 220 tex. Each of the 5 strands $T_2$ consists of 6 steel wires of diameter 0.26 mm and the pitches $p_e'$ and $p_i$ are respectively equal to 5.8 and 11.5 mm in the S/S direction.

In cable $C_{2quinquies}$ the internal layer $C_i$ is of the multifilament type and consists of two folded yarns of PET twisted together, each overtwist having a linear mass of 334 tex and being obtained by assembling two yarns each of 167 tex. Each of the 5 strands $T_2$ consists of 6 steel wires of diameter equal to 0.26 mm, and the aforesaid pitches $p_e'$ and $p_i$ are respectively equal to 5.2 and 9.5 mm in the S/S direction.

Table 1 below shows the mechanical properties of each cable $C_T$, $C_1$, $C_2$, $C_{2bis}$, $C_{2ter}$, $C_{2quater}$, $C_{2quinquies}$, the measurements having been made on these cables in isolation (i.e. before their incorporation in the composite fabric).

TABLE 1

|  | $C_T$ (24.26) | $C_1$ (25.26) Nylon ® core, monofilament | $C_2$ (31.26) Nylon ® core, monofilament | $C_{2bis}$ (31.26) PET core, monofilament | $C_{2ter}$ (31.26) PET core, multifilament | $C_{2quater}$ (31.26) PET core, multifilament | $C_{2quinquies}$ (31.26) PET core, multifilament |
|---|---|---|---|---|---|---|---|
| Total diameter (mm) | 1.9 | 2.40 | 2.90 | 2.83 | 2.86 | 2.70 | 2.53 |
| Linear mass (g/m) | 10.80 | 11.80 | 15.50 | 16.53 | 16.57 | 14.57 | 14.43 |
| Fm (N) | 2600 | 2960 | 3200 | 4069 | 3585 | 3222 | 3460 |
| Rigidity R (daN) | 11600 | 6500 | 6200 | 6360 | 11900 | 9150 | 5180 |
| As (%) | 1.9 | 4.3 | 6.6 | 9.5 | 9.5 | 6.7 | 8.0 |
| Ae (%) | 2.3 | 4.6 | 5 | 7.8 | 5.6 | 3.5 | 6.8 |
| Ap (%) | 1.2 | 1.1 | 1.4 | 0.5 | 0.9 | 0.3 | 0.9 |
| At (%) | 5.4 | 10.2 | 13.0 | 17.8 | 16.0 | 10.5 | 15.7 |

In what follows, the mechanical properties of two of the above cables $C_1$ and $C_2$ according to the invention, having formulae 1+4×(1+5) and 1+5×(1+5) respectively, as those of a "control" cable $C_T$ of the strand type, will be given.

The said "control" cable $C_T$ is represented in the upper part of the diagram of FIG. 3 opposite the force-deformation curve that characterises it, and it can be seen to consist of 4 strands T" comprising 6 steel wires $f_m'$ of diameter equal to 0.26 mm (this cable $C_T$, known by the name "24.26", is currently used by the applicant in the tyres for earthmover, of size "40.00 R 57", that it markets).

FIG. 3 shows the values of rigidity R (daN) and relative elongation at break At (%) for each of the cables $C_T$, $C_1$, $C_2$.

Besides, four other cables $C_{2bis}$, $C_{2ter}$, $C_{2quater}$ and $C_{2quinquies}$ according to the invention (not shown) respectively constitute variants of the said cable $C_2$ with formula 1+5×(1+5).

In cable $C_{2bis}$ the said internal layer $C_i$ consists of a sized monofilament of PET (diameter $d_i$ equal to 1 mm), the 5 strands $T_2$ each consist of 6 steel wires of diameter equal to 0.26 mm, and the aforesaid pitches $p_e'$ and $p_i$ are respectively equal to 5.3 and 9.9 mm in the winding directions S/S.

In cable $C_{2ter}$ the internal layer $C_i$ is of the multifilament type and consists of two folded yarns of PET twisted together, each having a linear mass of 440 tex and being obtained by It was also checked that each of the cables according to the invention with a multifilament core $C_1$, namely $C_{2ter}$, $C_{2quater}$ and $C_{2quinquies}$, is such that the said core $C_i$ is shorter than the external layer formed by the strands in the axial direction of the cable, in contrast to the cables according to the invention with a monofilament core $C_i$, such as $C_{2bis}$, in which the said core $C_i$ is axially longer.

The result of this axial shortness of the multifilament core is that it does not melt during an electrical welding operation required to join two cables end to end, which means that the cables according to the invention with a multifilament core do not impede this welding operation.

Another result of this axial shortness is that plies of "straight filament" cables are easier to make up, since it is not necessary to cut off the excess axial length of the cores.

Rolling Tests of Tyres Whose Crown Protection Plies are Reinforced by the Cables $C_1$ and $C_2$ of the Invention or by the "Control" Cable $C_T$:

Rolling tests were carried out on vehicles provided with earthmover tyres of size "18.00R33×P51", first on ground covered by sharp stones and secondly on ground covered by more rounded stones, in order to evaluate the resistance to shocks and perforation of the tyres tested, namely the "control" tyres $P_T$ and the tyres $P_1$ and $P_2$ according to the invention.

In each of their two crown protection plies NSP1 and NSP2 the "control" tyres $P_T$ comprise the aforesaid "control" cables $C_T$ (of formula "25.26"), with a density d of cables per dm of fabric equal to 40 and with a rubber "bridge" width ΔL between adjacent cables equal to 0.6 mm (the distance between the respective axes of two adjacent cables $C_T$ being 2.5 mm and the diameter of the cables $C_T$ being 1.9 mm).

In each of their two crown protection plies NSP1 and NSP2 the first tyres according to the invention $P_1$ comprise the aforesaid cables $C_1$ according to the invention (those with the formula 1+4×(1+5)), with a density d equal to 31 and a rubber "bridge" width ΔL equal to 0.8 mm (the distance between the respective axes of two adjacent cables $C_1$ being 3.2 mm and the diameter of the cables $C_1$ being 2.4 mm).

In each of their two crown protection plies NSP1 and NSP2 the second tyres according to the invention $P_2$ comprise the aforesaid cables $C_2$ according to the invention (having the formula 1+5×(1+5)), with a density d equal to 28 and a rubber "bridge" width ΔL equal to 0.6 mm (the distance between the respective axes of two adjacent cables $C_2$ being 3.5 mm and the diameter of the cables $C_2$ being 2.9 mm).

At the end of a given time the rolling is stopped and the tyres tested are then "peeled". For each type the following are then counted:

the number of perforations in the tread, then in the radially lower crown protection plies (NSP2, then NSP1, radially further in), and then in the crown working plies (NST2 and NST1, radially still further in);

the number of broken cables in each crown ply NSP2, NSP1, NST2, NST1, and the number and respective areas of the "blisters" between the crown protection ply NSP2 and the underlayer of the tread (these "blisters" or detached areas are mainly due to the propagation of splits in the radially upper mix of the tyre, and their area is evaluated by likening them to ellipses).

Table 2 below shows the results obtained as relative values, taking as reference the "control" tyres $P_T$ for which the number of perforations, the number of broken cables and the number and area of the "blisters" are all expressed as base 100. For the tyres $P_1$ and $P_2$ according to the invention, the corresponding values are related to these "control" values (i.e. they are expressed as percentages thereof, being respectively lower or higher than 100 if their absolute values are lower or higher than the absolute "control" values).

The results also show that the plies NSP2 and NSP1 reinforced by these cables $C_1$ and $C_2$ result in a reduction on average of the number of perforations between the tread and the working crown plies.

Note that the best results in terms of shock resistance and perforations are obtained with tyres incorporating the cables $C_2$ according to the invention, as much for the number of perforations as for the number of broken cables and "blisters".

The invention claimed is:

1. A hybrid layered cable comprising a non-metallic internal layer forming a core and an unsaturated external layer comprising strands, each strand being at least partly metallic and wound helically over the internal layer, wherein said cable, at break under traction, has a relative elongation which is higher than 7%, wherein the number of strands is from 3 to 12, each strand comprising at least three filaments wound helically at a pitch which is equal to or less than a winding pitch of the strand around the internal layer.

2. The cable according to claim 1, wherein said relative elongation is equal to or higher than 10%.

3. The cable according to claim 2, wherein said relative elongation is equal to or higher than 12%.

4. The cable according to claim 1, wherein said internal layer comprises at least one material having, at break under traction, a relative elongation at 20° C. which is higher than 6%.

5. The cable according to claim 1, wherein said filaments ($f_m$, $f_a$, $f_a$') of each strand (T, T', $T_1$, $T_2$) and said strands (T, T', $T_1$, $T_2$) are wound in the same twist direction.

6. The cable according to claim 1, wherein said internal layer forming a core comprises one or more yarns each comprising a multitude of elementary filaments.

7. The cable according to claim 1, wherein said internal layer forming a core comprises one or more folded yarns each comprised of an assembly of several yarns.

8. The cable according to claim 1, wherein said internal layer comprises an aliphatic polyamide.

9. The cable according to claim 8, wherein said internal layer comprises a 6.6 polyamide.

10. The cable according to claim 1, wherein said internal layer comprise an aliphatic polyester.

11. The cable according to claim 10, wherein said internal layer comprises a polyethylene terephthalate or a polyethylene naphthalate.

TABLE 2

| Tyres | Number of perforations | | | | | Number of broken cables | | | | <<Blisters>> | |
| --- | --- | --- | --- | --- | --- | --- | --- | --- | --- | --- | --- |
| | in tread | in NSP2 | In NSP1 | in NST2 | in NST1 | in NSP2 | in NSP1 | in NST2 | in NST1 | number | area S (mm$^2$) |
| $P_T$ | 100 | 100 | 100 | 100 | 100 | 100 | 100 | 100 | 100 | 100 | 100 |
| $P_1$ | 88 | 79 | 75 | 117 | 29 | 43 | 23 | 24 | 17 | 65 | 68 |
| $P_2$ | 106 | 48 | 42 | 28 | 29 | 20 | 5 | 21 | 21 | 79 | 84 |

These results show in particular that in the crown protection plies NSP2 and NSP1 reinforced by hybrid layered cables $C_1$ or $C_2$ according to the invention, on the one hand the number of cables broken in each ply of the crown reinforcement, and on the other hand the number and area of "blisters" formed by detachment, are considerably smaller compared with the plies NSP1 and NSP2 reinforced by the control strand cables $C_T$.

12. The cable according to claim 1, wherein said internal layer comprises rayon.

13. The cable according to claim 1, wherein said cable comprises N=4 strands ($T_1$) each consisting of n=6 metallic wires ($f_m$, $f_a$), which include a core metallic wire ($f_a$) around which 5 other metallic wires ($f_m$) are wound helically.

14. The cable according to claim 1, wherein said cable comprises N=5 strands $T_1$ each consisting of n=6 metallic wires ($f_m$, $f_a$), which include a core metallic wire ($f_a$) around which 5 other metallic wires ($f_m$) are wound helically.

15. The cable according to claim 1, wherein said cable comprises N=3 strands (T') each consisting of 7 filaments ($f_m$, $f_a'$), which include a non-metallic core filament ($f_a'$) around which m=6 metallic wires ($f_m$) are wound helically.

16. The cable according to claim 1, wherein said cable comprises N=7 strands (T) each consisting of n=3 metallic wires ($f_m$) twisted together helically.

17. The cable according to claim 1, wherein the internal layer ($C_i$) has a diameter $d_i$, $d_i'$ around which are wound in helix of pitch $p_i$, $p_i'$ the strands (T, T', $T_1$, $T_2$), being N or N' in number, wherein each strand (T, T', $T_1$, $T_2$) comprises:
  n metallic wires ($f_m$) of diameter $d_e$ twisted together in helix of pitch $p_e$, or comprising n-1 wires ($f_m$) wound with pitch $p_e'$ around a core wire ($f_a$) for the strand (T, T', $T_1$, $T_2$), the cable (C, $C_1$, $C_2$) satisfying all the following conditions:
  (ai) the internal layer ($C_i$) is composed of a material having a relative elongation at break during traction at 20° C. in excess of 6%;
  (aii) $0.17 \leq d_e$ (in mm) $\leq 0.36$;
  (aiii) $1.1(d_e) \leq d_i$ (in mm) $\leq 5(d_e)$;
  (aiv) $3 \leq N \leq 12$;
  (av) $3 \leq n \leq 6$;
  (avi) $5(d_i) \leq p_e$ (in mm) $\leq 20(d_i)$ or $5(d_i) \leq p_e'$ (in mm) $\leq 20(d_i)$;
  (avii) $p_e \leq p_i$ (in mm) $\leq 3(p_e)$ or $p_e' \leq p_i$ (in mm) $\leq 3(p_e')$.

18. The cable according to claim 17, wherein said filaments ($f_m$, $f_a$, $f_a'$) of each strand (T, T', $T_1$, $T_2$) and said strands (T, T', $T_1$, $T_2$) are wound in the same twist direction.

19. The cable according to claim 17, wherein said internal layer forming a core consists of a monofilament.

20. The cable according to claim 17, wherein said cable satisfies the following condition:
  (aviii) $1.5(p_e) \leq p_i$ (in mm) $\leq 2(p_e)$ or $1.5(p_e') \leq p_i$ (in mm) $\leq 2(p_e')$.

21. The cable according to claim 17, wherein said cable satisfies the following condition:
  (aix) $4 \leq p_e \leq p_i$ (in mm) $\leq 12$ or $4 \leq p_e' \leq p_i$ (in mm) $\leq 12$.

22. The cable according to claim 1, wherein the internal layer ($C_i$) has a diameter $d_i$, $d_i'$ around which are wound in helix of pitch $p_i$, $p_i'$ the strands (T, T', $T_1$, $T_2$), being N or N' in number, wherein each strand (T, T', $T_1$, $T_2$) comprises:
  m metallic wires ($f_m$) of diameter $d_e'$ wound in helix of pitch $p_e''$ around a non-metallic core filament ($f_a''$) of diameter $d_{fa}$, the cable (C') satisfying all the following conditions:
  (bi) the internal layer ($C_i$) is composed of identical or different materials each having a relative elongation at break during traction at 20° C. in excess of 6%;
  (bii) $0.17 \leq d_e'$ (in mm) $\leq 0.36$;
  (biii) $1.1(d_e') \leq d_{fa}$ (in mm) $\leq 3(d_e')$;
  (biv) $1.1(d_{fa}+2(d_e')) \leq d_i' \leq 3(d_{fa}+2(d_e'))$
  (bv) $3 \leq N' \leq 12$;
  (bvi) $5 \leq m \leq 12$;
  (bvii) $10(d_i') \leq p_e''$ (in mm) $\leq 20(d_i')$;
  (bviii) $p_e'' \leq p_i'$ (in mm) $\leq 3(p_e'')$.

23. The cable according to claim 22, wherein said filaments ($f_m$, $f_a$, $f_a'$) of each strand (T, T', $T_1$, $T_2$) and said strands (T, T', $T_1$, $T_2$) are wound in the same twist direction.

24. The cable (C') according to claim 22, wherein in the core filament ($f_a'$) for each strand (T') consists of a monofilament.

25. The cable (C') according to claim 24, wherein the core filament ($f_a'$) comprises an aliphatic polyamide.

26. The cable (C') according to claim 25, wherein said core filament ($f_a'$) comprises a 6.6 polyamide.

27. The cable (C') according to claim 24, wherein said core filament ($f_a'$) comprises an aliphatic polyester.

28. The cable (C') according to claim 27, wherein said core filament ($f_a'$) comprises one of a polyethylene terephthalate or a polyethylene naphthalate.

29. The cable (C') according to claim 24, wherein said core filament ($f_a'$) comprises rayon.

30. The cable according to claim 22, wherein said cable satisfies the following condition:
  (bix) $1.5(p_e'') \leq p_i'$ (in mm) $\leq 2(p_e'')$.

31. The cable according to claim 22, wherein said cable satisfies the following condition:
  (bx) $4 \leq p_e'' \leq p_i'$ (in mm) $\leq 12$.

* * * * *